United States Patent
Gilstad et al.

(10) Patent No.: US 8,746,654 B2
(45) Date of Patent: *Jun. 10, 2014

(54) TUNABLE FLUID END

(71) Applicants: Dennis W. Gilstad, San Antonio, TX (US); Barbara C. Gilstad, San Antonio, TX (US)

(72) Inventors: Dennis W. Gilstad, San Antonio, TX (US); Barbara C. Gilstad, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,046

(22) Filed: Oct. 7, 2013

(65) Prior Publication Data

US 2014/0034862 A1 Feb. 6, 2014

Related U.S. Application Data

(63) Continuation-in-part of application No. 13/711,644, filed on Dec. 12, 2012, now Pat. No. 8,567,753, and a continuation-in-part of application No. 13/296,251, filed on Nov. 15, 2011, now abandoned, and a continuation-in-part of application No. 13/228,475, filed on Sep. 9, 2011, now abandoned, and a continuation-in-part of application No. 13/228,474, filed on Sep. 9, 2011, now abandoned, and a (Continued)

(51) Int. Cl.
*F16K 31/44* (2006.01)

(52) U.S. Cl.
USPC ........... 251/214; 251/334; 251/332; 251/363; 251/367; 251/368; 137/516.29; 137/902; 137/904; 137/329.04; 277/558; 277/605; 277/645

(58) Field of Classification Search
USPC ......... 251/12, 48, 77, 80, 120, 214, 318, 334, 251/356–358, 363, 366–367; 137/516.29, 137/902, 904, 329.04; 277/333, 553, 558, 277/567, 605, 645, 647
See application file for complete search history.

(56) References Cited

U.S. PATENT DOCUMENTS 432,744 A * 7/1890 Adams .......................... 251/318
767,118 A 8/1904 Popham et al.
(Continued)

OTHER PUBLICATIONS

Introduction to Impulse Hammers, internet download Sep. 2011 from Dytran Instruments, Inc.

*Primary Examiner* — John K Fristoe, Jr.
*Assistant Examiner* — Marina Tietjen
(74) *Attorney, Agent, or Firm* — Dennis W. Gilstad

(57) ABSTRACT

Tunable fluid end embodiments comprise a family, each family member comprising a pump housing with at least one installed tunable component chosen from: tunable valve assemblies, tunable valve seats, tunable radial arrays and/or tunable plunger seals. For example, a tunable valve assembly or tunable radial array selectively attenuates valve-generated vibration at its source, thus reducing the likelihood of fluid end failures associated with fatigue cracking and/or corrosion fatigue. Adding tunable valve seats and/or tunable plunger seals to a fluid end facilitates optimal damping and/or selective attenuation of vibration at one or more predetermined (and frequently localized) fluid end resonant frequencies. Thus, the likelihood of exciting destructive resonances in a pump's fluid end housing is further reduced. Optimized vibration attenuation and optimized fluid end damping are provided by altering resonant frequencies in each tunable component in relation to one or more fluid end resonant frequencies and/or tunable component resonant frequencies.

14 Claims, 8 Drawing Sheets

Related U.S. Application Data continuation-in-part of application No. 13/210,407, filed on Aug. 16, 2011, now Pat. No. 8,292,260, and a continuation-in-part of application No. 13/196,916, filed on Aug. 3, 2011, now Pat. No. 8,267,371, and a continuation-in-part of application No. 13/616,098, filed on Sep. 14, 2012, now Pat. No. 8,403,337, and a continuation-in-part of application No. 13/525,391, filed on Jun. 18, 2012, now Pat. No. 8,292,301, and a continuation-in-part of application No. 13/456,235, filed on Apr. 26, 2012, now Pat. No. 8,276,918, and a continuation-in-part of application No. 13/184,965, filed on Jul. 18, 2011, now Pat. No. 8,210,542.

(56) References Cited

U.S. PATENT DOCUMENTS

| | | |
|---|---|---|
| 829,546 A | 8/1906 | Schou |
| 1,705,800 A | 3/1929 | Akeyson |
| 1,716,896 A | 6/1929 | Miller |
| 1,733,180 A | 10/1929 | Biedermann |
| 2,002,672 A | 5/1935 | Melott |
| 2,011,547 A | 8/1935 | Campbell |
| 2,018,288 A | 10/1935 | Steirly |
| 2,178,876 A | 11/1939 | MacClatchie |
| 2,298,632 A | 10/1942 | Thorner |
| 2,329,576 A | 9/1943 | Anderson |
| 2,446,196 A | 8/1948 | Sitney |
| 2,792,016 A | 5/1957 | Shellman et al. |
| 3,004,633 A | 10/1961 | Hobson |
| 3,047,007 A | 7/1962 | Lunken |
| 3,053,500 A | 9/1962 | Atkinson |
| 3,053,501 A | 9/1962 | Varga |
| 3,054,452 A | 9/1962 | Napolitano |
| 3,172,424 A | 3/1965 | Stillwagon |
| 3,540,472 A | 11/1970 | Brady et al. |
| 3,617,589 A | 11/1971 | Jones-Hinton et al. |
| 3,687,464 A * | 8/1972 | Jackson et al. ............... 277/553 |
| 3,827,671 A | 8/1974 | Bolden et al. |
| 3,951,849 A | 4/1976 | Vickery et al. |
| 4,088,301 A | 5/1978 | Ehmig |
| 4,103,909 A | 8/1978 | Hoffman et al. |
| 4,181,027 A | 1/1980 | Talbott, Jr. |
| 4,254,792 A | 3/1981 | Schadel |
| 4,269,419 A | 5/1981 | Brant |
| 4,300,775 A | 11/1981 | Ringel |
| 4,572,519 A | 2/1986 | Cameron et al. |
| 4,602,762 A | 7/1986 | Koch et al. |
| 4,687,421 A | 8/1987 | Cameron et al. |
| 4,759,428 A | 7/1988 | Seshimo |
| 4,852,533 A | 8/1989 | Doncker et al. |
| 4,860,995 A | 8/1989 | Rogers |
| 4,951,707 A | 8/1990 | Johnson |
| 5,073,096 A | 12/1991 | King et al. |
| 5,088,521 A | 2/1992 | Johnson |
| 5,091,455 A | 2/1992 | Blank et al. |
| 5,158,162 A | 10/1992 | Fink et al. |
| 5,183,863 A | 2/1993 | Nakamura et al. |
| 5,226,445 A | 7/1993 | Surjaatmadja |
| 5,238,744 A | 8/1993 | Williams et al. |
| 5,249,600 A | 10/1993 | Blume |
| 5,262,232 A | 11/1993 | Wilfong et al. |
| 5,275,204 A | 1/1994 | Rogers et al. |
| 5,370,150 A | 12/1994 | Nehm |
| 5,431,186 A | 7/1995 | Blume |
| 5,507,477 A | 4/1996 | Manning et al. |
| 5,580,068 A | 12/1996 | Gundy |
| 5,629,503 A | 5/1997 | Thomasen |
| 5,639,098 A | 6/1997 | MacDonald |
| 5,670,006 A | 9/1997 | Wilfong et al. |
| 5,799,953 A | 9/1998 | Henderson |
| 5,979,242 A | 11/1999 | Hobbs |
| 6,000,677 A | 12/1999 | Cook et al. |
| 6,026,776 A | 2/2000 | Winberg |
| 6,056,270 A | 5/2000 | Zimmerly |
| 6,290,205 B1 | 9/2001 | Haga et al. |
| 6,293,514 B1 | 9/2001 | Pechoux et al. |
| 6,331,578 B1 | 12/2001 | Turner et al. |
| 6,432,320 B1 | 8/2002 | Bonsignore et al. |
| 6,701,529 B1 | 3/2004 | Rhoades et al. |
| 6,713,438 B1 | 3/2004 | Baillargeon et al. |
| 6,811,140 B1 * | 11/2004 | Maini ............................ 251/264 |
| 6,959,727 B2 | 11/2005 | Krishnamoorthy et al. |
| 7,081,223 B2 | 7/2006 | Khoury |
| 7,222,837 B1 | 5/2007 | Blume |
| 7,287,545 B2 | 10/2007 | Zeison |
| 7,429,220 B2 | 9/2008 | Kuntimaddi et al. |
| 7,513,483 B1 | 4/2009 | Blume |
| 7,513,759 B1 | 4/2009 | Blume |
| 7,591,450 B1 | 9/2009 | Blume |
| 7,608,314 B2 | 10/2009 | Plant |
| 7,794,827 B2 | 9/2010 | Palmer et al. |
| 7,847,057 B2 | 12/2010 | Muller et al. |
| 7,942,603 B2 | 5/2011 | Miller |
| 2004/0226616 A1 | 11/2004 | Vicars |
| 2005/0084229 A1 | 4/2005 | Babbitt et al. |
| 2005/0206096 A1 | 9/2005 | Browne et al. |
| 2007/0025811 A1 | 2/2007 | Wilhelm |
| 2007/0138423 A1 | 6/2007 | Smith |
| 2008/0279706 A1 | 11/2008 | Gambier et al. |
| 2010/0072413 A1 | 3/2010 | Koyomogi |
| 2010/0148452 A1 * | 6/2010 | Westhoff et al. ............... 277/605 |
| 2010/0264364 A1 * | 10/2010 | Wagner et al. ............ 252/182.12 |
| 2010/0327208 A1 | 12/2010 | Doutt |
| 2011/0240064 A1 | 10/2011 | Wales et al. |
| 2012/0035309 A1 | 2/2012 | Zhu et al. |
| 2012/0136356 A1 | 5/2012 | Doherty et al. |
| 2013/0019955 A1 | 1/2013 | Bagagli et al. |

\* cited by examiner

TUNABLE FLUID END

FIELD OF THE INVENTION

The invention relates generally to reciprocating high-pressure pumps, and more specifically to vibration and vibration effects in such pumps.

BACKGROUND

Reciprocating high-pressure pumps (commonly called frac pumps) are often used in oil and gas fields for hydraulic fracturing of rock formations to increase hydrocarbon yields. Such pumps are often truck-mounted for easy relocation from well-to-well. And they are usually designed in two sections: the (proximal) power section (herein "power end") and the (distal) fluid section (herein "fluid end"). Each pump fluid end comprises at least one subassembly (and typically three or more in a single fluid end housing), with each subassembly comprising a suction valve, a discharge valve, a plunger or piston, and a portion of (or substantially the entirety of) a pump fluid end subassembly housing (shortened herein to "pump housing" or "fluid end housing" or "housing" depending on the pump configuration).

For each pump fluid end subassembly, its pump housing comprises a pumping chamber in fluid communication with a suction bore, a discharge bore, and a piston/plunger bore. A suction valve (i.e., a check valve) within the suction bore, together with a discharge valve (i.e., another check valve) within the discharge bore, control bulk fluid movement from suction bore to discharge bore via the pumping chamber. Pulsatile fluid flow through the pump results from periodic pressurization of the pumping chamber by a reciprocating plunger or piston within the piston/plunger bore. Suction and pressure strokes alternately produce wide pressure swings in the pumping chamber (and across the suction and discharge valves) as the reciprocating plunger or piston is driven by the pump power end.

Such pumps are operated at peak pumped-fluid pressures in current practice up to about 15,000 psi, while simultaneously being weight-limited due to the carrying capacity of the trucks on which they are mounted. See, e.g., U.S. Pat. No. 7,513,759 B1, incorporated by reference.

Due to high peak pumped-fluid pressures, suction valves experience particularly wide pressure variations between a suction stroke, when the valve opens, and a pressure stroke, when the valve closes. For example, during a pressure stroke a valve body may be driven longitudinally toward contact with its corresponding valve seat with total valve closing force from about 50,000 to over 150,000 pounds (depending on pumped-fluid pressure and valve body transverse area). Valve-closure impact energy, in the form of a short-duration high-amplitude valve-closure impulse, thus constitutes a mechanical shock affecting the valve body, the valve seat, and the housing in which the valve is installed.

A mechanical shock can be represented in the time domain by an impulse plot (acceleration vs. time), and in the frequency domain by a vibration spectrum (amplitude vs. frequency). The shock of valve-closure impact is particularly prominent (i.e., comprising relatively high acceleration values) when it occurs as a conventionally-rigid valve body contacts a conventional frusto-conical valve seat. The valve body's longitudinal movement typically stops abruptly, together with the associated longitudinal movement of a proximal mass of pressurized fluid in contact with the valve body. The kinetic energy of the moving valve body and pressurized fluid is thus nearly instantly converted to a high-amplitude valve-closure impulse of short duration. The effect may be compared to striking the valve seat repeatedly with a commercially-available impulse hammer configured to produce relatively broad-spectrum high-frequency excitation (i.e., vibration) in an object struck by the hammer (see, e.g., *Introduction to Impulse Hammers* at http://www.dytran.com/img/tech/a11.pdf)

Thus, relatively broad-spectrum high-frequency vibration predictably results from the high-energy valve-closure impulse typically experienced by a conventionally-rigid valve body contacting a conventional frusto-conical valve seat. Nearly all of this vibration energy is quickly transmitted, via the valve seat, to proximate areas of the pump housing where it can be expected to excite damaging resonances that predispose the housing to fatigue failures. See, e.g., U.S. Pat. No. 5,979,242, incorporated by reference. Frac pump maintenance costs are known in the well-service industry to be relatively high and growing, due to both rapid valve wear and the early emergence of structurally significant cracks suggestive of corrosion fatigue in the pump housing (particularly near the suction valve seat deck)

Proposed valve designs in the past have included relatively lighter valve bodies comprising lighter materials and/or one or more interior cavities. See, e.g., U.S. Pat. No. 7,222,837 B1, incorporated by reference. Notwithstanding the somewhat lower valve-closure impulse amplitudes theoretically associated with such lighter valve bodies, they have been less popular than heavier and substantially more rigid valve bodies. The latter valve bodies have historically been shown to be relatively durable, but that performance record was largely created in lower pressure applications where the vibration fatigue issues described above are less prominent.

The recent transition period from lower pressure pump applications to higher pressure applications generally might be compared to the transition from slow-turning two-cylinder automobile engines to higher-speed and higher-powered inline six-cylinder engines around the years 1903-1910. New engine failure modes became evident, though they were neither anticipated nor understood at the time. Whereas the earlier engines had been under-powered but relatively reliable, torsional crankshaft vibrations in the six-cylinder engines caused objectionable noise ("octaves of chatter from the quivering crankshaft") and unexpected catastrophic failures (e.g., broken crankshafts). (Quotation cited on p. 13 of *Royce and the Vibration Damper*, Rolls-Royce Heritage Trust, 2003). The vibration problems, though never entirely eliminated, were finally reduced to manageable levels after several crankshaft redesigns and the development of crankshaft vibration dampers pioneered by Royce and Lanchester.

Analogously, new fluid-end-related designs are needed now for reducing fluid end fatigue failures associated with valve-generated vibration. Repeatedly-applied valve-closure energy impulses must be modified and/or vibrations damped to reduce the excitation of destructive vibration resonances in valves, pump housings, and related fluid end structures.

SUMMARY OF THE INVENTION

Tunable fluid ends moderate vibration effects to extend fluid end service life. A family of embodiments, each comprising at least one tunable component, attenuates and damps valve-generated vibration. Tunable components are chosen from: tunable valve assemblies, tunable valve seats, tunable radial arrays and/or tunable plunger seals. Installing one or more tunable valve assemblies or tunable radial arrays in a pump housing (see, e.g., U.S. Pat. No. 8,496,224 B1, incorporated by reference) meets at least a portion of the need for new designs to reduce fluid end fatigue failures. By attenuating and damping valve-generated vibration at one or more predetermined assembly resonant frequencies, the likelihood of exciting destructive fluid end resonances in pump housings is reduced.

Vibration attenuation and damping are both accomplished in part by converting valve-closure energy to heat in each tunable component present in a tunable fluid end embodiment. Attenuation results from frequency-selective spectrum-narrowing modification of the valve-closure (or closing-energy) impulses that occur with each pump cycle. So attenuation effectively limits the bandwidth(s) of valve-generated vibration. Damping, on the other hand, converts a portion of this band-limited vibration to heat. Both attenuation and damping are dependent in part on constraints causing shear-stress alteration (that is, "tuning") imposed on one or more viscoelastic and/or shear-thickening elements in each tunable component. Additionally, hysteresis associated with mechanical compliance of certain structures (e.g., peripheral seals, valve bodies or springs) may aid in converting vibration energy to heat. Tunable component resonant frequencies are shifted (or tuned) in each case to approximate predetermined values corresponding to measured or estimated pump or fluid end housing resonant frequencies (herein termed "critical" frequencies).

In continuous pump operation, mechanical compliance is manifest in elastic valve body and peripheral seal flexures secondary to repetitive longitudinal compressive forces (i.e., plunger pressure strokes). Each such flexure is followed by an elastic rebound, the duration of the entire flexure-rebound interval being termed "rebound cycle time." The inverse of rebound cycle time is termed "rebound characteristic frequency." Cumulative energy loss in the form of heat (e.g., hysteresis loss plus friction loss) is continuously transported for redistribution within the valve body and eventual rejection to the valve body surroundings (including, e.g., the pumped fluid). This heat, which is substantially lost to the valve body surroundings, represents a reduction in the energy content (and thus the damage-causing potential) of the valve-closure energy impulse applied to the pump housing.

Note that lengthening rebound cycle time to beneficially narrow the valve-generated vibration spectrum is accomplished in various invention embodiments using mechanical/hydraulic/pneumatic analogs of electronic wave-shaping techniques. For example, lengthened rebound cycle time is substantially influenced by the valve assembly's increased longitudinal compliance associated with the rolling contact (i.e., comprising seal and valve body flexure and rebound) described herein between the valve body/seal and the valve seat.

As each tunable component present in a tunable fluid end embodiment absorbs, converts and redistributes (i.e., dissipates) a portion of closing energy, only a fraction of the original closing energy remains at critical frequencies capable of exciting destructive resonant frequencies in the fluid end. Following vibration attenuation, a significant portion of valve-closure energy has been shifted to lower frequency vibration through structural compliance as described above. Attenuated vibration is then selectively damped (i.e., dissipated as heat) via one or more of the tunable components. Selective damping of vibration frequencies near the resonant frequencies of fluid ends is desirable for the same reason that soldiers break step when they march over a bridge—because even relatively small amounts of vibration energy applied at the bridge's resonant frequency can cause catastrophic bridge failure.

The functions of selective vibration attenuation and damping in tunable fluid ends are particularly beneficial because they focus the functions of vibration-limiting resources (e.g., tunable components) on minimization of vibration energy present in the fluid end near its housing's critical frequencies. Cost and complexity of tunable components are thus minimized while the efficacy of each tunable component's function (i.e., vibration limitation at particular frequencies) is enhanced. Stated another way, a tunable component's selective vibration attenuation and damping are optimized using metrics including cost, complexity, and damping factor (or degree of damping).

Note that a variety of optimization strategies for vibration attenuation and damping may be employed in specific cases, depending on parameters such as the Q (or quality) factor attributable to each fluid end resonance. Lower Q connotes a relatively broader band of near-resonant frequencies, while higher Q connotes a narrower band (ideally, a single frequency). Since ideal fluid end resonances are not encountered in practice, optimization strategies typically include choice of the Q of the tunable component in light of the Q of the fluid end resonance of interest. In tunable components of the invention, choice of Q depends on both materials and structure, especially structural compliances and the properties of viscoelastic and/or shear-thickening materials present in the component(s). Further, the center (or representative) frequency of a tunable component or a fluid end resonance may not be unambiguously obtainable. Thus, optimization of tunable component vibration damping may be an iterative process and may not be characterized by a single-valued solution. Note also that tunable component resonant frequencies may be intentionally "detuned" (i.e., adjusted to slightly different values from nominal housing resonant or center frequencies) in pursuit of an overall optimization strategy.

To minimize fluid end fatigue failures then, resonant frequencies of each tunable component of the invention are adjusted (i.e., tuned) using both analytical and empirical frequency measures. Such measures are considered in light of the resonant frequencies of any other tunable component(s) present, and also in light of critical resonances of the fluid end itself. The objective is optimal attenuation and damping of the most destructive portion(s) of valve-generated vibration. In each case, optimal vibration limitation will be dependent on the component's capacity to dissipate heat generated by hysteresis and/or fluid turbulence. Thus, certain predetermined portion(s) of valve-closure energy are dissipated at one or more predetermined pump housing resonant (critical) frequencies. Note that the critical frequencies proximate to a pump housing suction bore may differ, for example, from the critical frequencies proximate to the same pump housing's plunger bore due to the different constraints imposed by structures proximate the respective bores. Such differences are accounted for in the adjustment of tunable components, particularly tunable valve seats and tunable plunger seals.

What follows are descriptions of the structure and function of each tunable component that may be present in a tunable fluid end embodiment. Each tunable fluid end embodiment comprises at least one subassembly, and each subassembly comprises a housing (e.g., a fluid end housing or pump housing), a suction valve, a discharge valve, a plunger, and (in at least one subassembly) at least one tunable component. In specific tunable fluid end embodiments, tunable component(s) (e.g., tunable valve assemblies, tunable valve seats, tunable radial arrays and/or tunable plunger seals) may be employed singly or in various combinations, depending on operative requirements.

The first tunable component described is a tunable valve assembly (one being found in each tunable valve). Each tunable valve assembly comprises a valve body having guide means to maintain valve body alignment, a peripheral valve seat interface, and a peripheral groove spaced radially apart from a central reservoir. A plurality of viscoelastic body elements is disposed in the groove and reservoir to damp vibration, the viscoelastic groove element comprising a groove circumferential tubular area. The viscoelastic reservoir element has at least a first predetermined assembly resonant frequency substantially replicating a resonant frequency of the fluid end housing. And the groove circumferential tubular area comprises at least one shear thickening material having at least a second predetermined assembly resonant frequency similar to the first predetermined assembly resonant frequency. Note that the longitudinal compliance of a tunable valve assembly affects its rebound cycle time and thus influences vibration attenuation by the assembly.

The second tunable component described is a tunable valve seat, which comprises a mating surface longitudinally spaced apart from a lateral support mounting surface, together with a lateral support assembly. The lateral support assembly is adjustably secured on the mounting surface (e.g., by first and second securable end spacers) and comprises a plurality of circular viscoelastic support elements, each support element comprising a support circumferential tubular area. When installed with a tunable valve assembly as described above, each support circumferential tubular area comprises at least one shear thickening material having at least a second predetermined seat resonant frequency similar to the first predetermined assembly resonant frequency. But when installed in conjunction with conventional suction and discharge valves, each support circumferential tubular area comprises at least one shear thickening material having at least a separately predetermined seat resonant frequency substantially replicating a resonant frequency of the fluid end housing.

The third tunable component described is a tunable radial array disposed in a valve body. The valve body comprises guide means, a peripheral valve seat interface, and a fenestrated peripheral groove spaced radially apart from a central reservoir. A viscoelastic body element disposed in the groove (the groove element) is coupled to a viscoelastic body element disposed in the reservoir (the reservoir element) by a plurality of viscoelastic fenestration elements passing through a plurality of fenestrations in the peripheral groove (the fenestration elements). Each fenestration element comprises at least one polymer composite and functions as a radial tension member. Radial tension members connect the groove element with the reservoir element, a baseline level of radial tension typically arising due to shrinkage of the viscoelastic elements during curing. The tensioned radial members, as schematically illustrated herein, assist anchoring of the coupled groove element firmly within the peripheral seal-retention groove without the use of adhesives and/or serrations as have been commonly used in anchoring conventional valve seals. Radial tension members also create a damped resilient linkage of groove element to reservoir element (analogous in function to a spring-mass damper linkage). This damped linkage can be "tuned" to approximate one or more critical frequencies via choice of the viscoelastic and/or composite materials in the groove, fenestration and reservoir elements. Note that radial tension members also furnish a transverse preload force on the valve body, thereby altering longitudinal compliance, rebound cycle time (and thus rebound characteristic frequency), and vibration attenuation.

The fourth tunable component described is a tunable plunger seal comprising at least one lateral support assembly securably and sealingly positionable along a plunger (e.g., in at least one packing box or analogous structure), each said lateral support assembly comprising a plurality of circular viscoelastic support elements, each said support element comprising a support circumferential tubular area. When installed with a tunable valve assembly as described above, each support circumferential tubular area comprises at least one shear thickening material having at least a second predetermined seal resonant frequency similar to the first predetermined assembly resonant frequency. But when installed in conjunction with conventional suction or discharge valves, each support circumferential tubular area comprises at least one shear thickening material having at least a separately predetermined seat resonant frequency substantially replicating a resonant frequency of the fluid end housing Note that the predetermined resonant frequency of each viscoelastic element is affected by the viscoelastic material(s) comprising it, as well as by constraints imposed via adjacent structures (e.g., portions of the valve body) and/or by the choice of a variety of viscoelastic element inclusions. Examples of such viscoelastic element inclusions are reinforcing fibers, circumferential and/or central cavities within the viscoelastic element, and distributions of special-purpose materials (e.g., shear-thickening materials and/or graphene) within or in association with one or more viscoelastic elements.

Note also that the lateral support assembly of either a tunable valve seat or a tunable plunger seal resiliently links the respective valve seat or plunger with adjacent portions of a fluid end housing, effectively creating a spring-mass damper coupled to the housing. This damped linkage can be "tuned" to approximate one or more critical frequencies via, e.g., shear-thickening materials in the respective circumferential tubular areas as described herein.

Analogous damped linkages between the housing and one or more auxiliary masses may be incorporated in tunable fluid end embodiments for supplemental vibration damping.

Further as noted above, constraints on viscoelastic elements due to adjacent structures can function as a control mechanism by altering valve resonant frequencies. Examples of such effects are seen in embodiments comprising an adjustable flange coupled to the valve body for imposing a predetermined shear preload by further constraining a viscoelastic element already partially constrained in the reservoir. One or more valve assembly resonant frequencies may thus be predictably altered. Consequently, the associated valve-generated vibration spectrum may be narrowed, and its amplitude reduced, through hysteresis loss of valve-closure impulse energy at each predetermined assembly resonant frequency (e.g., by conversion of valve-closure impulse energy to heat energy, rather than vibration energy).

Other control mechanisms for alteration of assembly resonant frequencies include addition of composite elements to one or more viscoelastic groove elements. Further, peripheral groove fenestrations, when present, increase valve assembly responsiveness to longitudinal compressive force while stabilizing viscoelastic and/or composite peripheral groove elements. Such responsiveness includes, but is not limited to, variations in the width of the peripheral groove which facilitate "tuning" of the groove together with its viscoelastic element.

Briefly summarizing, each embodiment of a tunable valve assembly or tunable radial array attenuates and/or damps valve-generated vibration at one or more pump housing critical frequencies. The transmitted vibration spectrum is narrowed and its amplitude reduced through conversion and dissipation of valve-closure impulse energy as heat. One or more valve assembly or radial array structural features are tunable to at least one predetermined assembly resonant frequency to facilitate such impulse energy absorption, conversion and redistribution.

Continuing in greater detail, valve-closure impulse energy conversion in a tunable valve assembly or tunable radial array primarily arises from hysteresis loss (e.g., heat loss) in the viscoelastic groove and/or reservoir elements, but may also occur in related structures (e.g., in the valve body itself). Hysteresis loss in a particular structural feature is related in-part to that feature's compliance (i.e., the feature's structural distortion as a function of applied force).

Tunable structural features of a tunable valve assembly or tunable radial array include at least one compliant portion of the valve body, together with an associated viscoelastic element. Each compliant valve body portion distorts substantially elastically under the influence of a closing energy impulse, and its associated viscoelastic element simultaneously experiences shear stress in accommodating the distortion. The resulting viscoelastic shear strain, however, is at least partially time-delayed. And the time delay introduces a phase-shift useful in damping valve-generated vibration (i.e., reducing its amplitude).

In addition to vibration damping, a complementary function of a tunable valve assembly or tunable radial array is narrowing of the spectrum of valve-generated vibration. Spectrum narrowing is associated with compliance in the form of deformation over time in response to an applied force. Since each instance of compliance takes place over a finite time interval, the duration of a closing energy impulse is effectively increased (and the vibration spectrum correspondingly narrowed) as a function of compliance.

A narrowed valve-generated vibration spectrum, in turn, is less likely to generate destructive sympathetic vibration in adjacent regions of a fluid end housing. For this reason, compliant portions of a valve body are designed to elastically distort under the influence of the closing energy impulse (in contrast to earlier substantially-rigid valve designs). Compliance-related distortions are prominent in, but not limited to, the shapes of both the (peripheral) groove and the (relatively central) reservoir. Viscoelastic elements in the groove and reservoir resist (and therefore slow) the distortions, thus tending to beneficially increase the closing energy impulse's duration while narrowing the corresponding vibration spectrum.

Distortions of both groove and reservoir viscoelastic body elements result in viscoelastic stress and its associated time-dependent strain. But the mechanisms differ in the underlying the distortions. In a peripheral groove, for example, proximal and distal groove walls respond differently to longitudinal compressive force on the tunable valve assembly. They generally move out-of-phase longitudinally, thereby imposing time-varying compressive loads on the groove viscoelastic element. Thus the shape of the groove (and the overall compliance of the groove and its viscoelastic element) changes with time, making the groove as a whole responsive to longitudinal force on the assembly.

Peripheral groove fenestrations increase groove responsiveness to longitudinal force. As schematically illustrated herein, fenestrations increase groove responsiveness by changing the coupling of the proximal groove wall to the remainder of the valve body (see Detailed Description herein).

In the reservoir, in contrast, responsiveness to longitudinal force may be modulated by an adjustable preload flange centrally coupled to the valve body. The flange imposes a shear preload on the viscoelastic reservoir element (i.e., shear in addition to that imposed by the reservoir itself and/or by the closing energy impulse acting on the viscoelastic element via the pumped fluid). The amount of shear preload varies with the (adjustable) radial and longitudinal positions of the flange within the reservoir. The overall compliance and resonances of the reservoir and its viscoelastic element may be predictably altered by such a shear preload, which is imposed by the flange's partial constraint of the viscoelastic reservoir element. Note that when reservoir and groove viscoelastic body elements are coupled by a plurality of radial tension members, as in a tunable radial array, the radial tension members lying in groove wall fenestrations allow transmission of shear stress between the groove and reservoir viscoelastic elements.

Thus, in tunable radial array embodiments, at least a first predetermined resonant frequency may substantially replicate a pump housing resonant frequency via adjustment of shear preload on the reservoir viscoelastic element. The plurality of fenestration elements coupling the reservoir element with the groove element may have at least a second predetermined resonant frequency related to the first predetermined resonant frequency and optionally achieved through choice of tensile strength of the radial tension members (i.e., fenestration elements). And at least a third predetermined resonant frequency related to the first and second predetermined resonant frequencies may be achieved through choice of at least one shear thickening material in circumferential tubular areas of the groove viscoelastic element and/or one or more support circumferential tubular areas.

Note that any structural feature of a tunable valve assembly or tunable radial array (e.g., a valve body or a viscoelastic element) may be supplemented with one or more reinforcement components to form a composite feature. Reinforcement materials tend to alter compliance and may comprise, for example, a flexible fibrous material (e.g., carbon nanotubes, graphene), a shear-thickening material, and/or other materials as described herein.

As noted above, alterations in compliance (with its associated hysteresis loss) contribute to predetermined vibration spectrum narrowing. Such compliance changes (i.e., changes in displacement as a function of force) may be achieved through adjustment of constraint. Constraint, in turn, may be achieved, e.g., via compression applied substantially longitudinally by the adjustable preload flange to a constrained area of the viscoelastic reservoir element. In embodiments comprising a central longitudinal guide stem, the constrained area may be annular. And adjacent to such an annular constrained area may be another annular area of the viscoelastic reservoir element which is not in contact with the adjustable preload flange (i.e., an annular unconstrained area). This annular unconstrained area is typically open to pumped fluid pressure.

As shown by the schematic illustrations herein, preload flange adjustment changes compressive restraint applied to the annular area of the viscoelastic reservoir element adjacent to the preload flange. The result is substantially countercurrent viscoelastic strain (i.e., movement in shear) relative to the annular unconstrained area. Valve-closure impulse energy lost (i.e., redistributed or dissipated as heat) in connection with the resulting shear strain in the viscoelastic element is subtracted from the total closing impulse energy otherwise available to excite destructive vibration resonances in the tunable valve assembly, valve seat and/or pump housing. See, e.g., U.S. Pat. No. 5,158,162, incorporated by reference. Note that in viscoelastic and shear-thickening materials, the relationship between stress and strain (and thus the effect of material constraint on resonant frequency) is generally time-dependent and non-linear. So a desired degree of non-linearity in "tuning" may be predetermined by appropriate choice of viscoelastic and shear-thickening materials in a tunable valve assembly or tunable valve.

Preload flange adjustment may change the longitudinal compliance of the tunable valve assembly by changing the effective flange radius and/or the longitudinal position of the flange as it constrains the viscoelastic reservoir element. Effective flange radius will generally exceed actual flange radius due to slowing of (viscous) viscoelastic flow near the flange edge. This allows tuning of the valve assembly to a first assembly resonant frequency for maximizing hysteresis loss. Stated another way, by constraining a vibrating structure (e.g., an area of the viscoelastic reservoir element or a vibrating guitar string), it is possible to force the vibrational energy into different modes and/or frequencies. See, e.g., U.S. Pat. No. 4,181,027, incorporated by reference.

The invention thus includes means for constraining one or more separate viscoelastic elements of a valve assembly, as well as means for constraining a plurality of areas of a single viscoelastic element. And such constraint may be substantially constant or time-varying, with correspondingly different effects on resonant frequencies. Peripherally, time-varying viscoelastic element constraint may be provided by out-of-phase longitudinal movement of peripheral groove walls. In contrast, time-varying viscoelastic element constraint may be applied centrally by a flange coupled to the valve body.

Flange radial adjustment is facilitated, e.g., via a choice among effective flange radii and/or flange periphery configurations (e.g., cylindrical or non-cylindrical). Flange longitudinal movement may be adjusted, for example, by (1) use of mechanical screws or springs, (2) actuation via pneumatic, hydraulic or electrostrictive transducers, or (3) heat-mediated expansion or contraction. Flange longitudinal movement may thus be designed to be responsive to operational pump parameters such as temperature, acceleration, or pressure. Since pump housing resonant frequencies may also respond to such parameters, tunable valve assemblies and tunable valves may be made at least partially self-adjusting (i.e., operationally adaptive or auto-adjusting) so as to change their energy-absorbing and spectrum-narrowing characteristics to optimally extend pump service life.

Note that in certain embodiments, the preload flange may comprise a substantially cylindrical periphery associated with substantially longitudinal shear. Other embodiments may comprise a non-cylindrical periphery for facilitating annular shear preload having both longitudinal and transverse components associated with viscoelastic flow past the flange. Such an invention embodiment provides for damping of transverse as well as longitudinal vibration. Transverse vibration may originate, for example, when slight valve body misalignment with the valve seat causes abrupt lateral valve body movement during valve closing.

Note also that one or more flanges may or may not be longitudinally fixed to the guide stem for achieving one or more predetermined assembly resonant frequencies.

And note further that the first predetermined assembly resonant frequency of greatest interest, of course, will typically approximate one of the natural resonances of the pump and/or pump housing. Further, complementary hysteresis loss and vibration spectrum narrowing may be added via a second predetermined assembly resonant frequency achieved via the viscoelastic groove element (which may comprise a circumferential tubular shear-thickening component for reinforcement). The time-varying viscosity of the shear-thickening component, if present, furnishes a constraint of the vibrating structure analogous in part to that provided by the adjustable preload flange. The result is a predetermined shift of the tunable valve assembly's vibrating mode analogous to that described above.

In addition to a shift in the tunable valve assembly's vibrating mode, incorporation of a circumferential tubular shear-thickening material within the viscoelastic groove element increases impulse duration by slightly slowing valve closure due to reinforcement of the viscoelastic groove element. Increased impulse duration, in turn, narrows the closing energy impulse vibration spectrum. And the shear-thickening material itself is effectively constrained by its circumferential location within the viscoelastic groove element.

The shear-thickening material (sometimes termed dilatant material) is relatively stiff near the time of impact and relatively fluid at other times. Since the viscoelastic groove element strikes the valve seat before the valve body, complete valve closure is slightly delayed by the shear-thickening action. The delay effectively increases the valve-closure energy impulse's duration, which means that vibration which is transmitted from the tunable valve assembly to its valve seat and pump housing has a relatively narrower spectrum and is less likely to excite vibrations that predispose a pump housing to early fatigue failure. The degree of spectrum narrowing can be tuned to minimize excitation of known pump housing resonances by appropriate choice of the shear-thickening material. Such vibration attenuation, and the associated reductions in metal fatigue and corrosion susceptibility, are especially beneficial in cases where the fluid being pumped is corrosive.

The functions of the viscoelastic groove element, with its circumferential shear-thickening material, are thus seen to include those of a conventional valve seal as well as those of a tunable vibration attenuator and a tunable vibration damper. See, e.g., U.S. Pat. No. 6,026,776, incorporated by reference. Further, the viscoelastic reservoir element, functioning with a predetermined annular shear preload provided via an adjustable preload flange, can dissipate an additional portion of valve-closure impulse energy as heat while also attenuating and damping vibration. And viscoelastic fenestration elements, when present, may contribute further to hysteresis loss as they elastically retain the groove element in the seal-retention groove via coupling to the reservoir element. Overall hysteresis loss in the viscoelastic elements combines with hysteresis loss in the valve body to selectively reduce the bandwidth, amplitude and duration of vibrations that the closing impulse energy would otherwise tend to excite in the valve and/or pump housing.

Examples of mechanisms for such selective vibration reductions are seen in the interactions of the viscoelastic reservoir element with the adjustable preload flange. The interactions contribute to hysteresis loss in a tunable valve assembly by, for example, creating what has been termed shear damping (see, e.g., U.S. Pat. No. 5,670,006, incorporated by reference). With the preload flange adjustably fixed centrally to the valve body (e.g., fixed to a central guide stem), valve-closure impact causes both the preload flange and guide stem to temporarily move distally with respect to the (peripheral) valve seat interface (i.e., the valve body experiences a concave-shaped flexure). The impact energy associated with valve closure causes temporary deformation of the valve body; that is, the valve body periphery (e.g., the valve seat interface) is stopped by contact with the valve seat while the central portion of the valve body continues (under inertial forces and pumped-fluid pressure) to elastically move distally. Thus, the annular constrained area of the viscoelastic reservoir element (shown constrained by the preload flange in the schematic illustrations herein) moves substantially countercurrent (i.e., in shear) relative to the annular unconstrained area (shown radially farther from the guide stem and peripheral to the preload flange). That is, relative distal movement of the preload flange thus tends to extrude the (more peripheral) annular unconstrained area proximally. Energy lost (i.e., dissipated) in connection with the resulting shear strain in the viscoelastic element is subtracted from the total closing impulse energy otherwise available to excite destructive flow-induced vibration resonances in the valve, valve seat and/or pump housing. See, e.g., U.S. Pat. No. 5,158,162, incorporated by reference.

Another aspect of the interaction of the viscoelastic reservoir element with an adjustable preload flange contributes to vibration damping in a tunable valve assembly. As a result of compliance in the viscoelastic element, longitudinal movement of a guide stem and a coupled preload flange results in a phase lag as shear stress develops within the viscoelastic material. This is analogous to the phase lag seen in the outer ring movement in an automotive elastomeric torsional vibration damper or the antiphase movement of small masses in an automotive pendulum vibration damper. See, e.g., the '776 patent cited above. Adjusting the shear preload flange as described above effectively changes the tunable valve assembly's compliance and thus the degree of phase lag noted above. One may thus tune viscoelastic element preload to achieve effective vibration damping at specific frequencies of interest (e.g., pump housing resonant frequencies).

To achieve the desired hysteresis loss associated with attenuation and vibration damping effects described herein, different viscoelastic and/or composite elements may be constructed to have specific elastic and/or viscoelastic properties. Note that the term elastic herein implies substantial characterization by a storage modulus, whereas the term viscoelastic herein implies substantial characterization by a storage modulus and a loss modulus. See, e.g., the '006 patent cited above.

Specific desired properties for each viscoelastic element arise from a design concept requiring coordinated functions depending on the location of each element. The viscoelastic reservoir element affects hysteresis associated with longitudinal compliance of the tunable valve assembly because it viscoelasticly accommodates longitudinal deformation of the valve body toward a concave shape. Hysteresis in the viscoelastic groove element (related, e.g., to its valve seal and vibration damping functions) and the valve body itself further reduces closing energy impulse amplitude through dissipation of portions of closing impulse energy as heat.

Elastic longitudinal compliance of a tunable valve assembly results in part from elastic properties of the materials comprising the tunable valve assembly. Such elastic properties may be achieved through use of composites comprising reinforcement materials as, for example, in an elastic valve body comprising steel, carbon fiber reinforced polymer, carbon nanotube/graphene reinforced polymer, and/or carbon nanotube/graphene reinforced metal matrix. The polymer may comprise a polyaryletherketone (PAEK), for example, polyetheretherketone (PEEK). See, e.g., U.S. Pat. No. 7,847,057 B2, incorporated by reference.

Note that the description herein of valve body flexure as concave-shaped refers to a view from the proximal or high-pressure side of the valve body. Such flexure is substantially elastic and may be associated with slight circular rotation (i.e., a circular rolling contact) of the valve body's valve seat interface with the valve seat itself. When the degree of rolling contact is sufficient to justify conversion of the valve seat interface from the traditional frusto-conical shape to a convex curved shape (which may include, e.g., circular, elliptic and/or parabolic portions), a curved concave valve seat mating surface may be used. In such cases, the valve seat interface has correspondingly greater curvature than the concave valve seat mating surface (see Detailed Description herein). Such rolling contact, when present, augments elastic formation of the concave valve body flexure on the pump pressure stroke, reversing the process on the suction stroke.

The circular rolling contact described herein may be visualized by considering the behavior of the convex valve seat interface as the valve body experiences concave flexure (i.e., the transformation from a relatively flat shape to a concave shape). During such flexure the periphery of the valve seat interface rotates slightly inwardly and translates slightly proximally (relative to the valve body's center of gravity) to become the proximal rim of the concave-shaped flexure.

While substantially elastic, each such valve body flexure is associated with energy loss from the closing energy impulse due to hysteresis in the valve body. Frictional heat loss (and any wear secondary to friction) associated with any circular rolling contact of the convex valve seat interface with the concave valve seat mating surface is intentionally relatively low. Thus, the rolling action, when present, minimizes wear that might otherwise be associated with substantially sliding contact of these surfaces. Further, when rolling contact between valve body and valve seat is present during both longitudinal valve body flexure and the elastic rebound which follows, trapping of particulate matter from the pumped fluid between the rolling surfaces tends to be minimized.

Since rolling contact takes place over a finite time interval, it also assists in smoothly redirecting pumped fluid momentum laterally and proximally. Forces due to oppositely directed radial components of the resultant fluid flow tend to cancel, and energy lost in pumped fluid turbulence is subtracted (as heat) from that of the valve-closure energy impulse, thus decreasing both its amplitude and the amplitude of associated vibration.

In addition to the above described energy dissipation (associated with hysteresis secondary to valve body flexure), hysteresis loss will also occur during pressure-induced movements of the viscoelastic groove element (in association with the valve seal function). Note that pumped fluid pressure acting on a valve comprising the invention's tunable valve assembly will hydraulically pressurize substantially all of the viscoelastic elements in a tunable valve assembly. Although polymers suitable for use in the viscoelastic elements generally are relatively stiff at room ambient pressures and temperatures, the higher pressures and temperatures experienced during pump pressure strokes tend to cause even relatively stiff polymers to behave like fluids which can transmit pressure hydraulically. Thus, a viscoelastic element in a peripheral seal-retention groove is periodically hydraulically pressurized, thereby increasing its sealing function during the high-pressure portion of the pump cycle. Hydraulic pressurization of the same viscoelastic element is reduced during the low-pressure portion of the pump cycle when the sealing function is not needed.

Because of the above-described energy loss and the time required for valve body longitudinal deformation to take place, with the associated dissipation of closing impulse energy described above, a valve-closure energy impulse applied to a tunable valve assembly or tunable radial array is relatively lower in amplitude and longer in duration (e.g., secondary to having a longer rise time) than an analogous valve-closure energy impulse applied to a conventionally stiff valve body which closes on a conventional frusto-conical valve seat. The combination of lower amplitude and increased duration of the valve-closure energy impulse results in a narrowed characteristic vibration bandwidth having reduced potential for induction of damaging resonances in the valve, valve seat, and adjacent portions of the pump housing. See, e.g., the above-cited '242 patent.

Note that in describing the fluid-like behavior of certain polymers herein under elevated heat and pressure, the term "polymer" includes relatively homogenous materials (e.g., a single-species fluid polymer) as well as composites and combination materials containing one or more of such relatively homogenous materials plus finely divided particulate matter (e.g., nanoparticles) and/or other dispersed species (e.g., species in colloidal suspension, graphene) to improve heat scavenging and/or other properties. See, e.g., U.S. Pat. No. 6,432,320 B1, incorporated by reference.

In addition to heat scavenging, damping is a function of the viscoelastic elements in various embodiments of the invention. Optimal damping is associated with relatively high storage modulus and loss tangent values, and is obtained over various temperature ranges in multicomponent systems described as having macroscopically phase-separated morphology, microheterogeneous morphology, and/or at least one interpenetrating polymer network. See, e.g., the above-cited '006 patent and U.S. Pat. Nos. 5,091,455; 5,238,744; 6,331,578 B1; and 7,429,220 B2, all incorporated by reference.

Summarizing salient points of the above description, recall that vibration attenuation and damping in a tunable valve assembly or tunable radial array of the invention operate via four interacting mechanisms. First, impulse amplitude is reduced by converting a portion of total closing impulse energy to heat (e.g., via hysteresis and fluid turbulence), which is then ultimately rejected to the valve body surroundings (e.g., the pumped fluid). Each such reduction of impulse amplitude means lower amplitudes in the characteristic vibration spectrum transmitted to the pump housing.

Second, the closing energy impulse as sensed at the valve seat is reshaped (e.g., by lengthening the rebound cycle time associated with peripheral valve seal compression, concave valve body flexure and elastic rebound). Such reshaping may in general be accomplished using mechanical/hydraulic/pneumatic analogs of electronic wave-shaping techniques. In particular, lengthened rebound cycle time is substantially influenced by the valve body's increased longitudinal compliance associated with the rolling contact/seal and concave valve body flexure described herein between valve body and valve seat. The units of lengthened cycle times are seconds, so their inverse functions have dimensions of per second (or 1/sec), the same dimensions as frequency. Thus, as noted above, the inverse function is termed rebound characteristic frequency.

Lowered rebound characteristic frequency (i.e., increased rebound cycle time) corresponds to slower rebound, with a corresponding reduction of the impulse's characteristic bandwidth due to loss of higher frequency content. This condition is created during impulse hammer testing by adding to hammer head inertia and by use of softer impact tips of plastic (instead of the metal tips used when higher frequency excitation is desired). In contrast, tunable valve assemblies and tunable radial arrays achieve bandwidth narrowing (and thus reduction of the damage potential of induced higher-frequency vibrations) at least in part through increased longitudinal compliance. In other words, bandwidth narrowing is achieved in embodiments of the invention through an increase of the effective impulse duration (as by, e.g., slowing the impulse's rise time and/or fall time as the valve assembly's components flex and relax over a finite time interval).

Third, induced vibration resonances of the tunable valve assembly, valve seat, and/or pump housing structures (e.g., tunable valve seats and/or tunable plunger seals) are effectively damped by interactions generating hysteresis in tunable components as well as fluid turbulence, thus dissipating heat in the pumped fluid.

And fourth, the potential for excitation of damaging resonances in pump vibration induced by a closing energy impulse is further reduced through narrowing of the impulse's characteristic vibration bandwidth by increasing the valve body's effective inertia without increasing its actual mass. Such an increase of effective inertia is possible because a portion of pumped fluid moves with the valve body as it flexes and/or longitudinally compresses. The mass of this portion of pumped fluid is effectively added to the valve body's mass during the period of flexure/relaxation, thereby increasing the valve body's effective inertia to create a low-pass filter effect (i.e., tending to block higher frequencies in the manner of an engine mount).

To increase understanding of the invention, certain aspects of tunable components (e.g., alternate embodiments and multiple functions of structural features) are considered in greater detail. Alternate embodiments are available, for example, in guide means known to those skilled in the art for maintaining valve body alignment within a (suction or discharge) bore. Guide means thus include, e.g., a central guide stem and/or a distal crow-foot guide.

Similarly, alteration of a viscoelastic element's vibration pattern(s) in a tunable fluid end is addressed (i.e., tuned) via adjustable and/or time-varying constraints. Magnitude and timing of the constraints are determined in part by closing-impulse-related distortions and/or the associated vibration. For example, a viscoelastic reservoir (or central) element is at least partially constrained as it is disposed in the central annular reservoir, an unconstrained area optionally being open to pumped fluid pressure. That is, the viscoelastic reservoir element is at least partially constrained by relative movement of the interior surface(s) of the (optionally annular) reservoir, and further constrained by one or more structures (e.g., flanges) coupled to such surface(s). Analogously, a viscoelastic groove (or peripheral) element is at least partially constrained by relative movement of the groove walls, and further constrained by shear-thickening material within a circumferential tubular area of the element (which may comprise a plurality of lumens).

Since the magnitude and timing of closing-impulse-related distortions are directly related to each closing energy impulse, the tunable fluid end's overall response is adaptive to changing pump operating pressures and speeds on a stroke-by-stroke basis. So for each set of operating parameters (i.e., for each pressure/suction stroke cycle), one or more of the constrained viscoelastic elements has at least a first predetermined assembly resonant frequency substantially replicating an instantaneous pump resonant frequency (e.g., a resonant frequency measured or estimated proximate the suction valve seat deck). And for optimal damping, one or more of the constrained viscoelastic elements may have at least a second predetermined assembly resonant frequency similar to the first predetermined assembly resonant frequency.

Note that the adaptive behavior of viscoelastic elements is beneficially designed to complement both the time-varying behavior of valves generating vibration with each pump pressure stroke, and the time-varying response of the fluid end as a whole to that vibration.

Note also that a tunable valve assembly analogous to that designed for use in a tunable suction valve may be incorporated in a tunable discharge valve as well. Either a tunable suction valve or a tunable discharge valve or both may be installed in a pump fluid end housing. Additionally, one or more other tunable components may be combined with tunable suction and/or discharge valves. A pump housing resonant frequency may be chosen as substantially equal to a first predetermined assembly resonant frequency of each of the tunable components installed. Or the predetermined component resonant frequencies may be tuned to approximate different pump housing resonant frequencies as determined for optimal vibration damping.

For increased flexibility in accomplishing the above tuning, fenestrations may be present in the groove wall to accommodate radial tension members. At least a portion of each fenestration may have a transverse area which increases with decreasing radial distance to said longitudinal axis. That is, each fenestration flares to greater transverse areas in portions closer to the longitudinal axis, relative to the transverse areas of portions of the fenestration which are more distant from the longitudinal axis. Thus, a flared fenestration is partly analogous to a conventionally flared tube, with possible differences arising from the facts that (1) fenestrations are not limited to circular cross-sections, and (2) the degree of flare may differ in different portions of a fenestration.

Note that in addition to the example alternate embodiments described herein, still other alternative invention embodiments exist, including valves, pump housings and pumps comprising one or more of the example embodiments or equivalents thereof. During fabrication, internal valve body spaces may be formed by welding (e.g., inertial welding or laser welding) valve body portions together as in the above-cited '837 patent, or by separately machining such spaces with separate coverings. Valve body fabrication may also be by rapid-prototyping (i.e., layer-wise) techniques. See, e.g., the above-cited '057 patent. A viscoelastic element may be cast and cured in place in a valve body as described herein. See, e.g., U.S. Pat. No. 7,513,483 B1, incorporated by reference.

DETAILED DESCRIPTION

Tunable fluid end embodiments comprise a family, each family member comprising a pump housing with at least one installed tunable component chosen from: tunable valve assemblies, tunable valve seats, tunable radial arrays and/or tunable plunger seals. Installing one or more tunable valve assemblies, for example, facilitates selective attenuation of valve-generated vibration at its source. Fluid end failures associated with fatigue cracking and/or corrosion fatigue are thereby reduced. Adding tunable valve seats, tunable radial arrays and/or plunger seals to tunable valve assemblies in a fluid end further facilitates optimal damping and/or selective attenuation of vibration at one or more predetermined (and frequently-localized) fluid end resonant frequencies. Thus, the likelihood of exciting destructive resonances in a pump's fluid end housing is further reduced. Optimized vibration attenuation (i.e., optimized fluid end damping) is provided by altering resonant frequencies in each tunable component in relation to one or more (measured or estimated) fluid end resonant frequencies and/or tunable component resonant frequencies.

Figure 7:
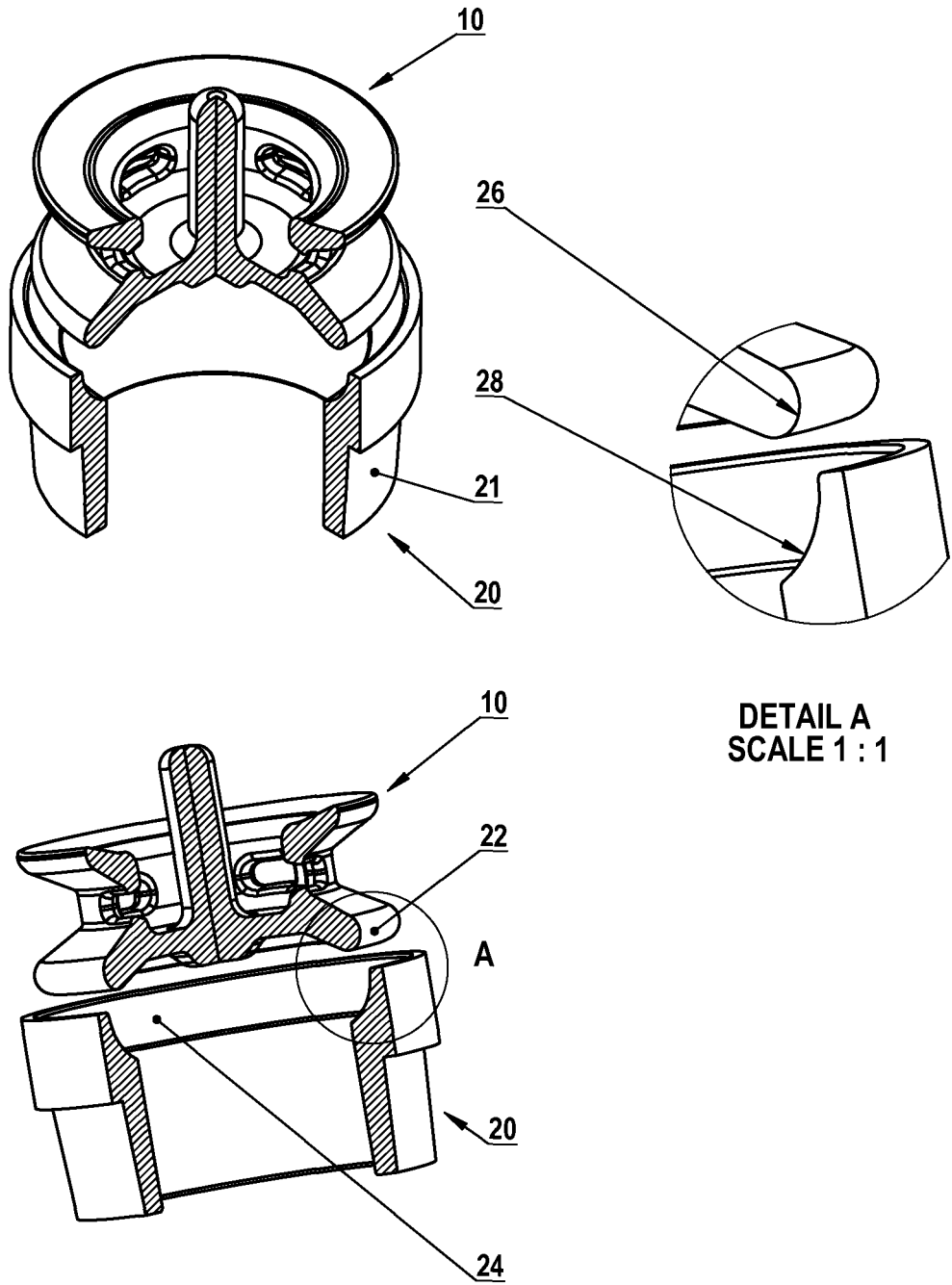
FIG. 7 is a schematic illustration of two views of an exploded partially-sectioned 3-dimensional view of a valve body and valve seat. Curved longitudinal section edges of the valve body's valve seat interface and mating portions of the valve seat are shown schematically in detail to aid description herein of a rolling valve seal. A tunable (suction or discharge) valve of the invention comprises a combination of a tunable valve assembly or tunable radial array (see, e.g., FIG. 1 and FIG. 2) and a valve seat or tunable valve seat (see, e.g., FIG. 7 and FIG. 8).

In general, a tunable (suction or discharge) valve of the invention may comprise a combination of a tunable valve assembly/tunable radial array 99 (see, e.g., FIG. 1) and a valve seat 20 (see, e.g., FIG. 7). Details of the structure and functions of each component are provided herein both separately and as combined with other components to obtain synergistic benefits contributing to longer pump service life.

Figure 1:
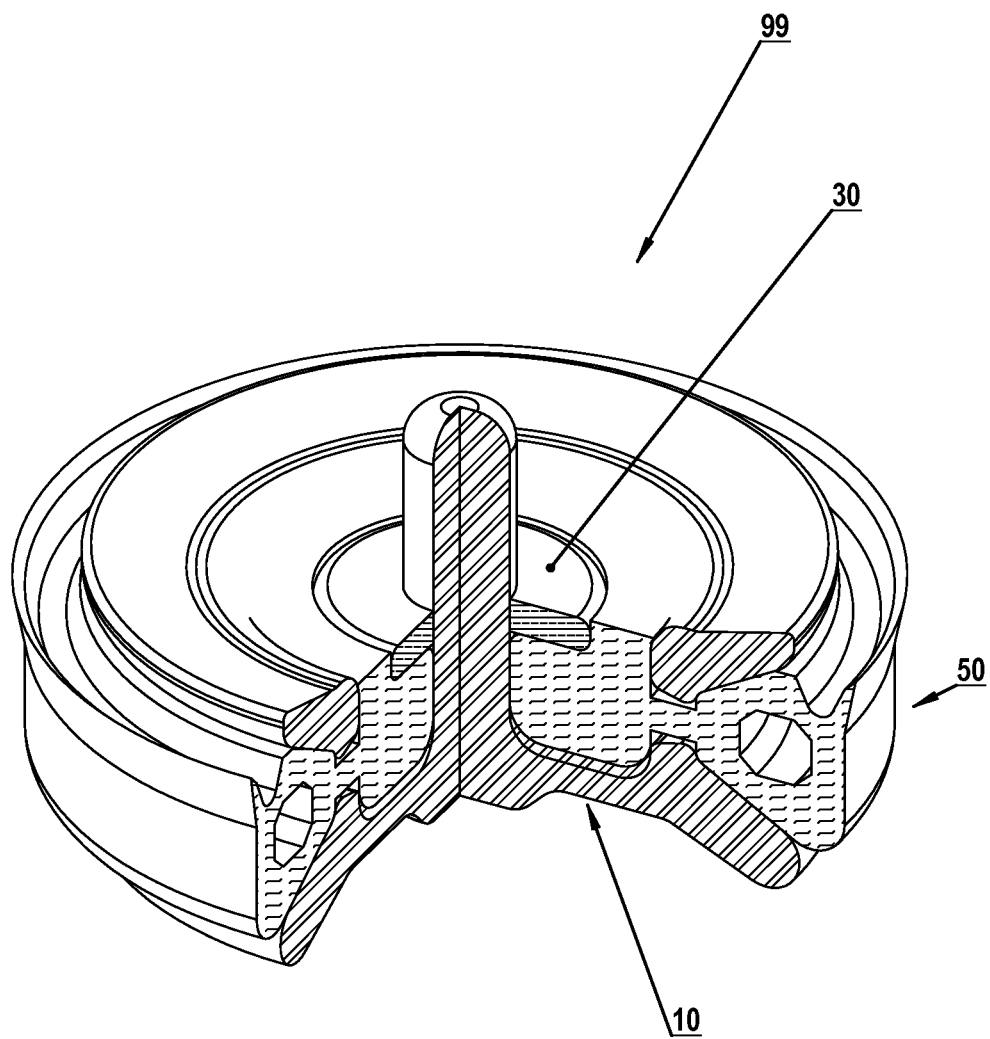
FIG. 1 is a schematic 3-dimensional view of a partially sectioned tunable valve assembly/tunable radial array showing how an adjustable preload flange constrains an area of the viscoelastic reservoir element as described herein.

FIG. 1 schematically illustrates an invention embodiment of a tunable valve assembly/tunable radial array 99 substantially symmetrical about a longitudinal axis. Illustrated components include a valve body 10, an adjustable preload flange 30, and a plurality of viscoelastic body elements 50. Valve body 10, in turn, comprises a peripheral groove 12 (see FIG. 2) spaced apart by an annular (central) reservoir 16 from a longitudinal guide stem 14, groove 12 being responsive to longitudinal compressive force. A plurality of viscoelastic body elements 50 comprises an annular (central) reservoir element 52 coupled to a (peripheral) groove element 54 by a plurality of (optional) radial fenestration elements 56 (in fenestrations 18) to form a tunable radial array. Groove element 54 functions as a vibration damper and valve seal, comprising at least one circumferential tubular area 58.

Responsiveness of groove 12 to longitudinal compressive force is characterized in part by damping of groove wall 11/13/15 vibrations. Such damping is due in part to out-of-phase vibrations in proximal groove wall 13 and distal groove wall 11 which are induced by longitudinal compressive force. Such out-of-phase vibrations will cause various groove-related dimensions to vary with longitudinal compressive force, thereby indicating the responsiveness of groove 12 to such force (see, for example, the dimension labeled A in FIG. 2). Each phase shift, in turn, is associated with differences in the coupling of proximal groove wall 13 to guide stem 14 (indirectly via longitudinal groove wall 15 and radial reservoir floor 19) and the coupling of distal groove wall 11 to guide stem 14 (directly via radial reservoir floor 19). Note that longitudinal groove wall 15 may comprise fenestrations 18, thereby increasing the responsiveness of groove 12 to longitudinal compressive force on tunable valve assembly 99.

Figure 2:
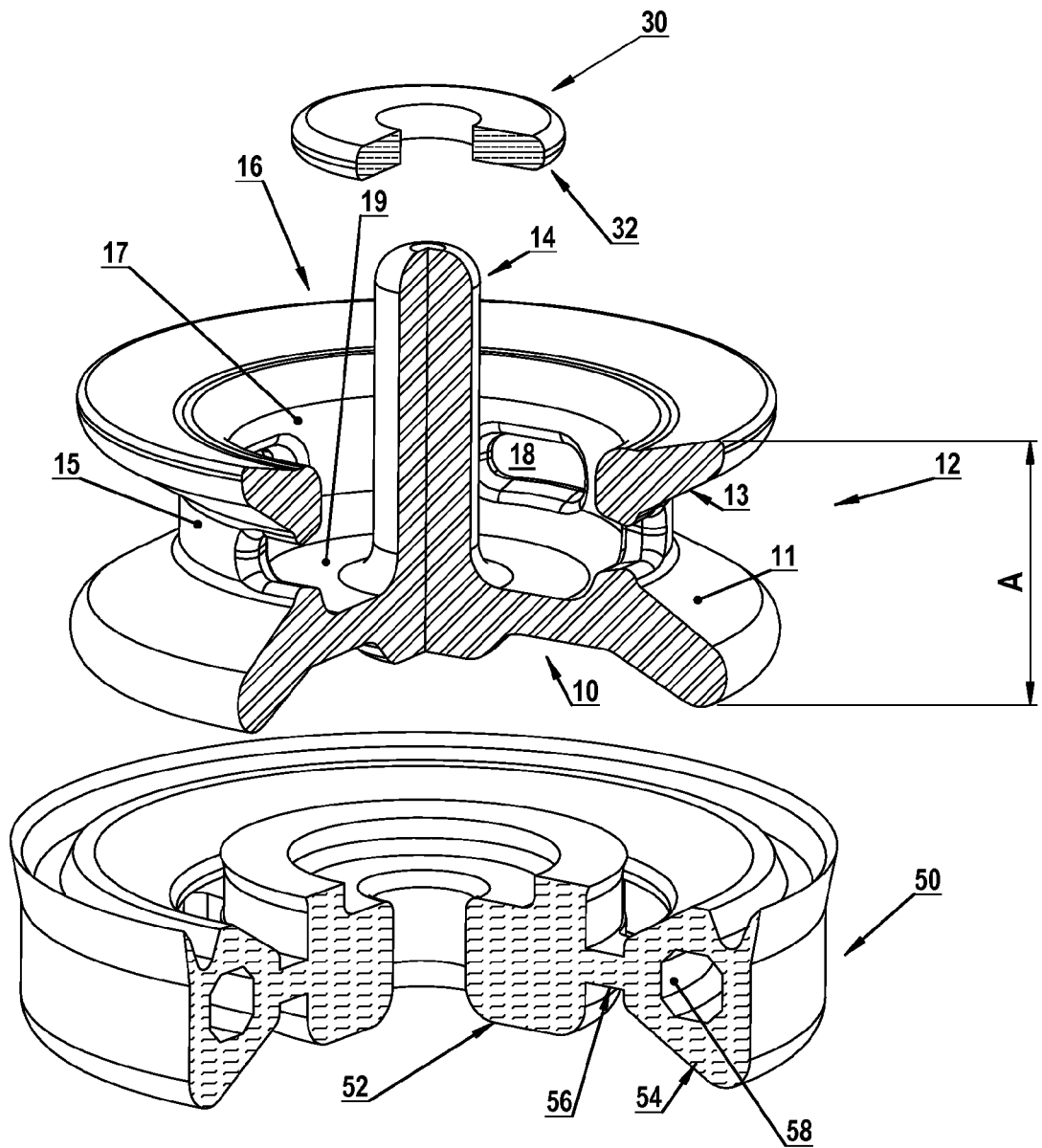
FIG. 2 includes a schematic 3-dimensional exploded view of the tunable valve assembly/tunable radial array of FIG. 1 showing viscoelastic body elements, the valve body, and the adjustable preload flange.
Figure 3:
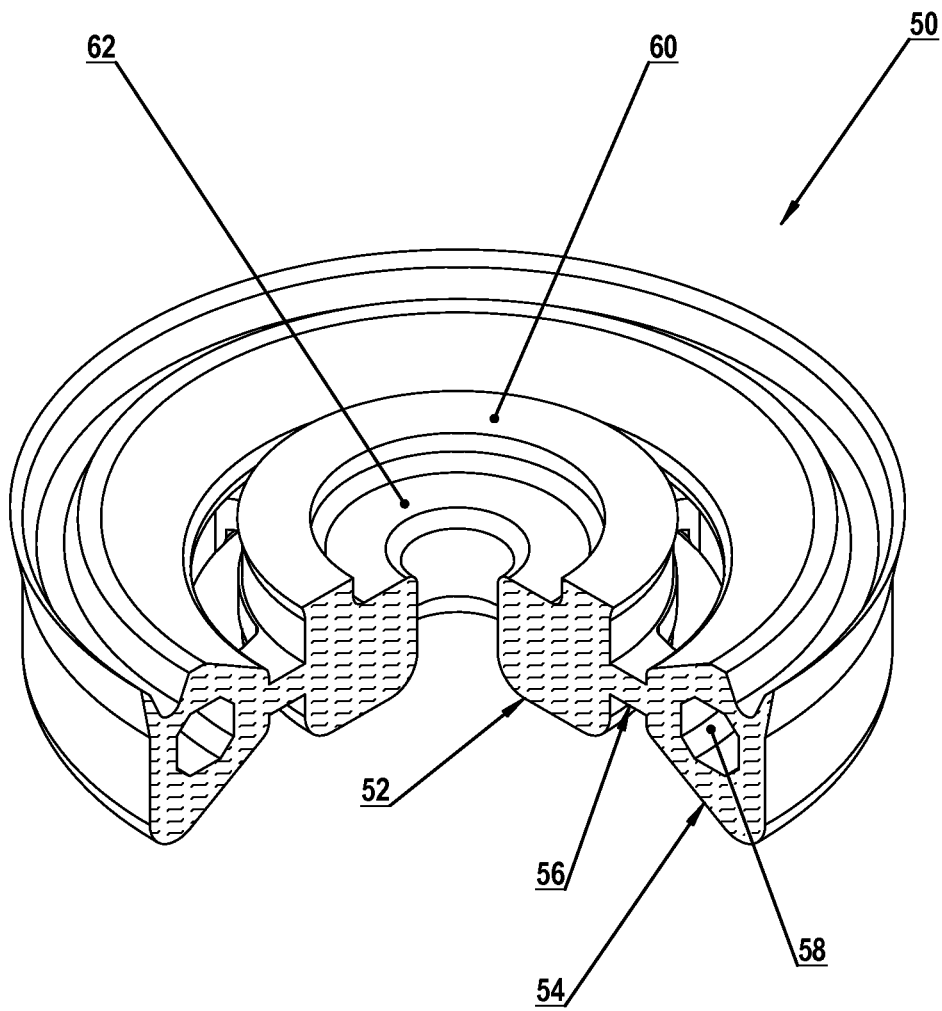
FIG. 3 is a schematic 3-dimensional partially-sectioned view of viscoelastic reservoir, groove and fenestration elements showing the constrained area of the reservoir element where it contacts an adjustable preload flange, as well as an adjacent unconstrained area.

Referring to FIGS. 1-3, adjustable preload flange 30 extends radially from guide stem 14 (toward peripheral reservoir wall 17) over, for example, about 20% to about 80% of viscoelastic reservoir element 52 (see FIG. 3). Adjustable preload flange 30 thus imposes an adjustable annular shear preload over an annular constrained area 62 of viscoelastic reservoir element 52 to achieve at least a first predetermined assembly resonant frequency substantially replicating a measured resonant frequency (e.g., a pump housing resonant frequency). Note that an adjacent annular unconstrained area 60 of viscoelastic reservoir element 52 remains open to pumped fluid pressure. Note also that adjustable preload flange 30 may be adjusted in effective radial extent and/or longitudinal position.

Note further that annular constrained area 62 and annular unconstrained area 60 are substantially concentric and adjacent. Thus, for a tunable suction valve subject to longitudinal (i.e., distally-directed) compressive constraint applied via preload flange 30 to annular constrained area 62, annular unconstrained area 60 will tend to move (i.e., extrude) proximally relative to area 62. The oppositely-directed (i.e., countercurrent) movements of constrained and unconstrained annular areas of viscoelastic reservoir element 52 create a substantially annular area of shear stress.

Figure 5:
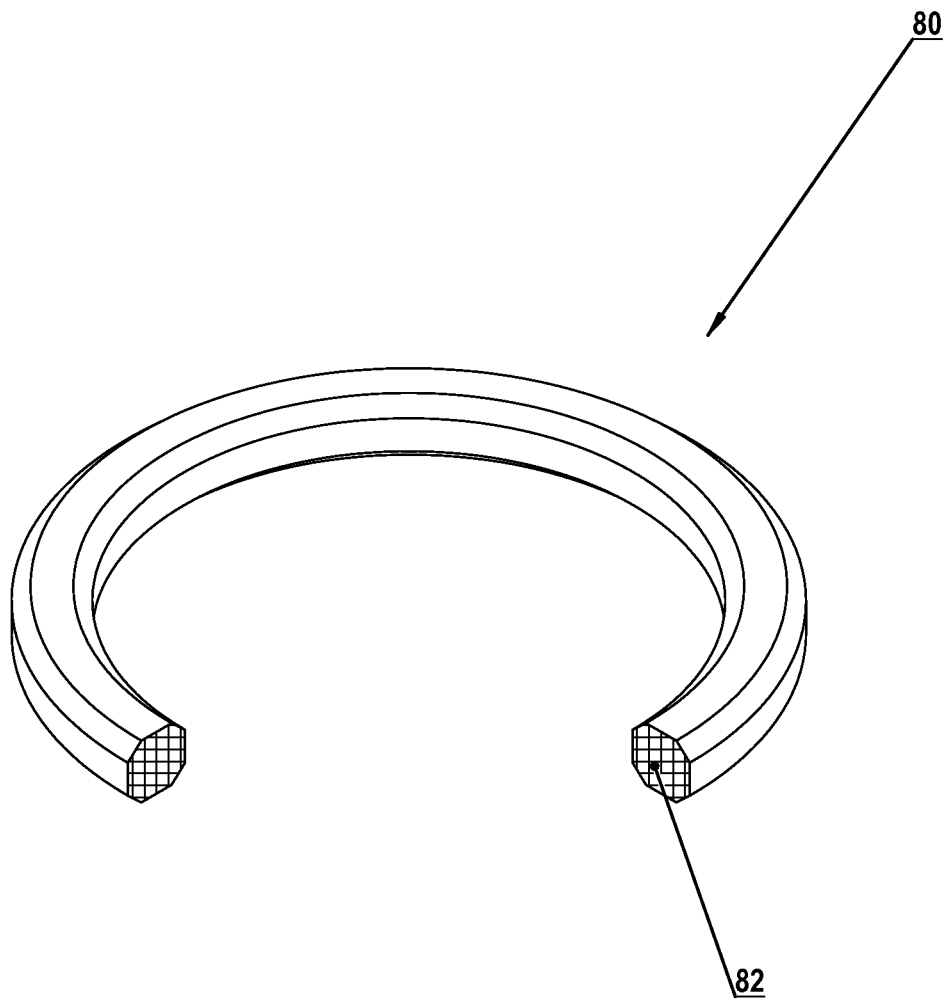
FIG. 5 is a schematic 3-dimensional instantaneous partially-sectioned view of shear-thickening material which would substantially fill a circumferential tubular area in the viscoelastic groove element and/or a support circumferential tubular area of a tunable valve seat or a tunable plunger seal.

Finally, each circumferential tubular area 58 is substantially filled with at least one shear-thickening material 80 (see FIG. 5) chosen to achieve at least a second predetermined assembly resonant frequency similar to the first predetermined assembly resonant frequency). Note that FIG. 5 schematically represents a partially-sectioned view of an instantaneous configuration of the shear-thickening material 80 within circumferential tubular area 58.

Referring to FIGS. 1 and 2 in greater detail, a tunable valve assembly/tunable radial array 99 comprises viscoelastic body elements 50 which comprise, in turn, reservoir (central) element 52 coupled to groove (peripheral) element 54 via radial fenestration (tension) elements 56. Elements 52, 54 and 56 are integrated with (i.e., lie substantially in) reservoir 16, groove 12 and fenestrations 18 respectively to provide a tuned radial array having at least a third predetermined resonant frequency. An adjustable preload flange 30 is coupled to guide stem 14 and contacts viscoelastic reservoir element 52 in reservoir 16 to impose an adjustable annular constraint on viscoelastic reservoir element 52 for achieving at least a first predetermined assembly resonant frequency substantially replicating a measured resonant frequency (e.g., a pump housing resonant frequency). Such adjustable annular constraint imposes an adjustable shear preload between constrained annular area 62 and unconstrained annular area 60. Tunable valve assembly 99 may additionally comprise at least one circumferential tubular area 58 in groove element 54 residing in groove 12, each tubular area 58 being substantially filled with at least one shear-thickening material 80 chosen to achieve at least a second predetermined assembly resonant frequency similar to the first predetermined assembly resonant frequency).

The above embodiment may be installed in a pump housing having a measured housing resonant frequency; the measured housing resonant frequency may then be substantially replicated in the first predetermined resonant frequency of the tunable valve assembly. Such a combination would be an application of an alternate embodiment. An analogous tuning procedure may be followed if the tunable valve assembly of the second embodiment is installed in a pump having a (similar or different) resonant frequency substantially equal to the second predetermined resonant frequency. This synergistic combination would broaden the scope of the valve assembly's beneficial effects, being yet another application of the invention's alternate embodiment.

Note that preload flange 30 may have a non-cylindrical periphery 32 for imposing on viscoelastic reservoir element 52 an adjustable annular shear preload having both longitudinal and transverse components.

Figure 4:
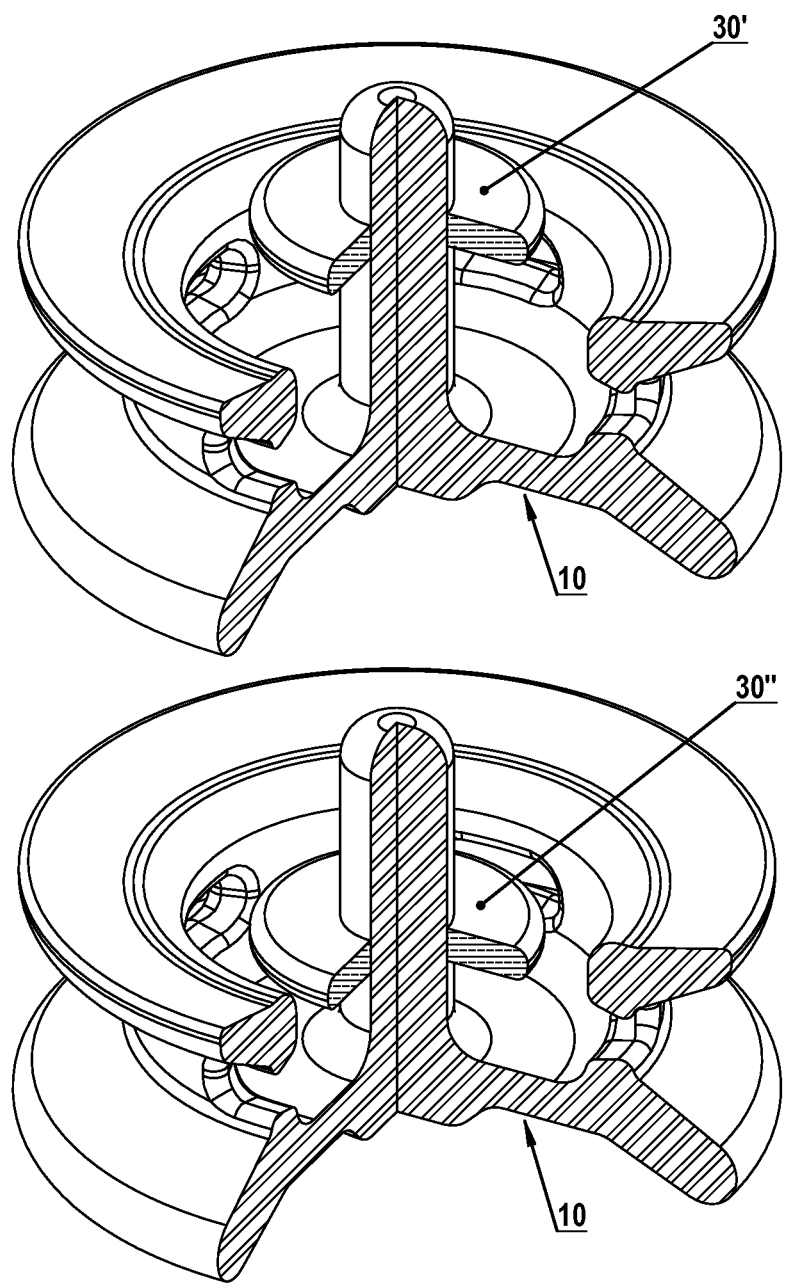
FIG. 4 is a schematic 3-dimensional partially-sectioned view of two valve bodies with an adjustable preload flange located at different longitudinal positions on a central guide stem.

Note further that the periphery of adjustable preload flange 30, if cylindrical, predisposes a tunable valve assembly to substantially longitudinal shear damping with each longitudinal distortion of valve body 10 associated with valve closure. The character of such shear damping depends, in part, on the longitudinal position of the preload flange. Examples of different longitudinal positions are seen in FIG. 4, which schematically illustrates the flange 30' longitudinally displaced from flange 30". Further, as shown in FIG. 4, the periphery of a longitudinally adjusted preload flange 30' or 30" may introduce shear damping of variable magnitude and having both longitudinal and transverse components. Such damping may be beneficial in cases where significant transverse valve-generated vibration occurs.

To clarify the placement of viscoelastic body elements 50, labels indicating the portions are placed on a sectional view in FIGS. 2 and 3. Actual placement of viscoelastic body elements 50 in valve body 10 (see FIG. 1) may be by, for example, casting viscoelastic body elements 50 in place, or placing viscoelastic body elements 50 (which have been precast) in place during layer-built or welded fabrication. The tunable valve assembly embodiment of the invention is intended to represent valve body 10 and viscoelastic body elements 50 components at any stage of manufacture leading to functional integration of the two components.

To enhance scavenging of heat due to friction loss and/or hysteresis loss, shear-thickening material 80 and/or viscoelastic body elements 50 may comprise one or more polymers which have been augmented with nanoparticles and/or graphene 82 (see, e.g., FIG. 5). Nanoparticles and/or graphene may be invisible to the eye as they are typically dispersed in a colloidal suspension. Hence, they are schematically represented by cross-hatching 82 in FIG. 5. Nanoparticles may comprise, for example, carbon forms (e.g., graphene) and/or metallic materials such as copper, beryllium, titanium, nickel, iron, alloys or blends thereof. The term nanoparticle may conveniently be defined as including particles having an average size of up to about 2000 nm. See, e.g., the '320 patent.

Figure 6:
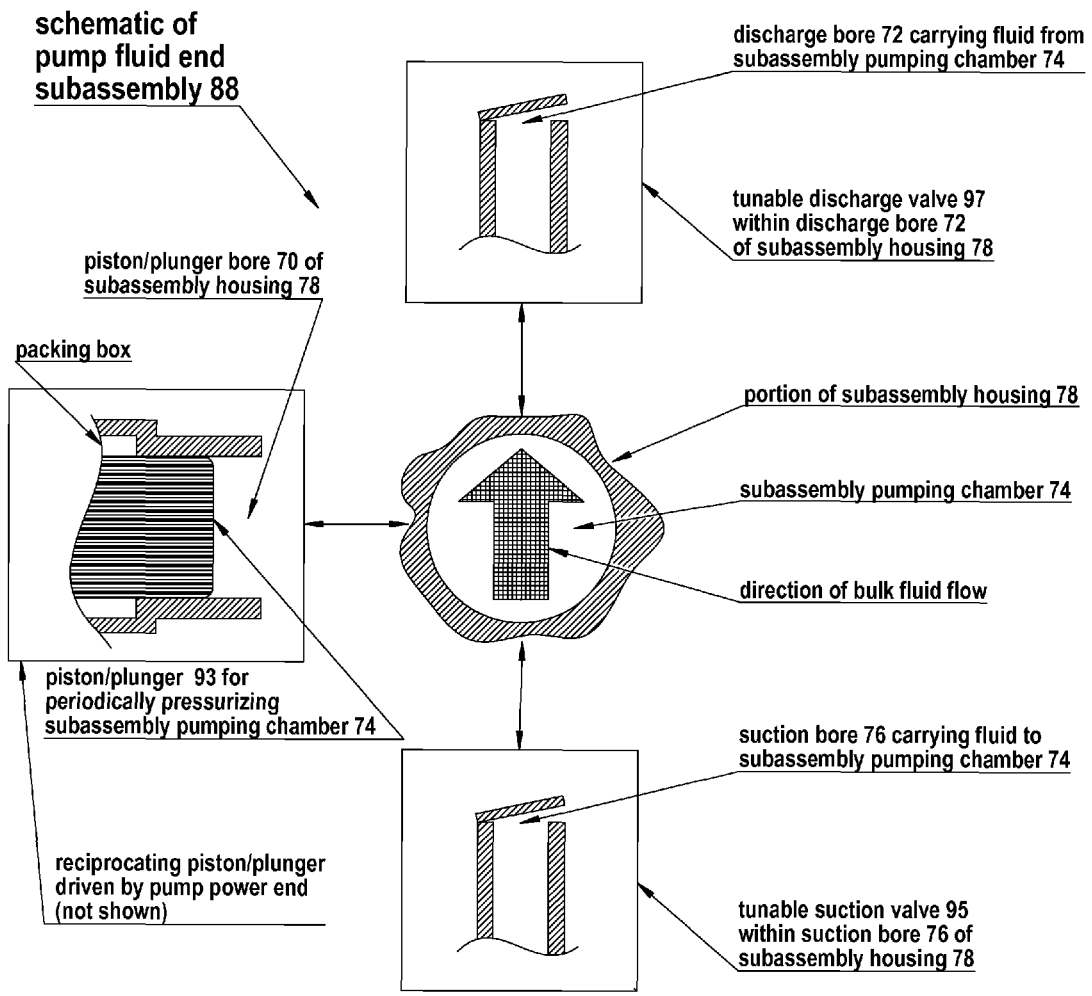
FIG. 6 is a schematic illustration of an exploded partially-sectioned 2-dimensional view of major components of a pump fluid end subassembly, together with brief explanatory comments on component functions. The schematically-illustrated subassembly comprises a pumping chamber within a subassembly pump housing, the pumping chamber being in fluid communication with a suction bore, a discharge bore, and a piston/plunger bore. Schematic representations of a suction valve, a discharge valve, and a piston/plunger are shown in their respective bores, together with brief annotations and graphical aids outlining the structural relationships.

FIG. 6 is a schematic illustration of an exploded partially-sectioned 2-dimensional view of major components of a pump fluid end subassembly 88, together with graphical aids and brief explanatory comments on component functions. The schematically-illustrated subassembly 88 comprises a pumping chamber 74 within a subassembly (pump) housing 78, the pumping chamber 74 being in fluid communication with a suction bore 76, a discharge bore 72, and a piston/plunger bore 70. Note that piston/plunger bore 70 comprises at least one recess (analogous to that labeled "packing box" in FIG. 6) in which at least one lateral support assembly 130 (see FIG. 8) may be sealingly positionable along the plunger as part of a tunable plunger seal embodiment. Schematic representations of a tunable suction valve 95 (illustrated for simplicity as a check valve), a tunable discharge valve 97 (also illustrated for simplicity as a check valve), and a piston/plunger 93 (illustrated for simplicity as a plunger) are shown in their respective bores.

Regarding the graphical aids of FIG. 6, the double-ended arrows that signify fluid communication between the bores (suction, discharge and piston/plunger) and the pumping chamber are double-ended to represent the fluid flow reversals that occur in each bore during each transition between pressure stroke and suction stroke of the piston/plunger. The large single-ended arrow within the pumping chamber is intended to represent the periodic and relatively large, substantially unidirectional fluid flow from suction bore through discharge bore during pump operation.

Further regarding the graphical aids of FIG. 6, tunable suction (check) valve 95 and tunable discharge (check) valve 97 are shown only schematically as check valves in FIG. 6 because of their relative complexity. Construction details of each such check valve are shown in FIGS. 1-5 and 7, each tunable check valve comprising a tunable valve assembly and a valve seat. In general, the tunable valve assemblies/tunable radial arrays of tunable suction and discharge valves will typically be tuned to different assembly resonant frequencies because of their different positions in a subassembly housing 78 (and thus in a pump housing as described herein). Pump housing resonant frequencies that are measured proximate the tunable suction and discharge valves will differ in general, depending on the overall pump housing design. In each case they serve to guide the choices of the respective assembly resonant frequencies for the valves.

Note that the combination of major components labeled in FIG. 6 as a pump fluid end subassembly 88 is so labeled (i.e., is labeled as a subassembly) because typical fluid end configurations comprise a plurality of such subassemblies combined in a single machined block. Thus, in such typical (multi-subassembly) pump fluid end designs, as well as in less-common single-subassembly pump fluid end configurations, the housing is simply termed a "pump housing" rather than the "subassembly housing 78" terminology of FIG. 6.

Further as schematically-illustrated and described herein, each pump fluid end subassembly 88 comprises only major components: a pumping chamber 74, with its associated tunable suction valve 95, tunable discharge valve 97, and piston/plunger 93 in their respective bores 76, 72 and 70 of subassembly housing 78. For greater clarity of description, common fluid end features well-known to those skilled in the art (such as access bores, plugs, seals, and miscellaneous fixtures) are not shown. Similarly, a common suction manifold through which incoming pumped fluid is distributed to each suction bore 76, and a common discharge manifold for collecting and combining discharged pumped fluid from each discharge bore 72, are also well-known to those skilled in the art and thus are not shown.

Note that the desired check-valve function of tunable valves 95 and 97 schematically-illustrated in FIG. 6 requires interaction of the respective tunable valve assemblies (see FIGS. 1-5) with a corresponding (schematically-illustrated) valve seat (see FIG. 7). The schematic illustrations of FIG. 6 are only intended to convey general ideas of relationships and functions of the major components of a pump fluid end subassembly. Structural details of the tunable valve assemblies that are in turn part of tunable valves 95 and 97 of the invention (including their respective valve seats) are illustrated in greater detail in FIGS. 1-5 and 7. Such structural details facilitate a plurality of complementary functions that are best understood through reference to FIGS. 1-5 and 7.

The above complementary functions include, but are not limited to, closing energy conversion to heat, energy redistribution through rejection of heat to the pumped fluid and pump housing, vibration damping, selective vibration spectrum narrowing through changes in tunable valve assembly compliance, and selective vibration attenuation through energy dissipation (i.e., via redistribution) at predetermined assembly resonant frequencies.

FIG. 7 is a schematic illustration of two views of an exploded partially-sectioned 3-dimensional view including a valve body 10 and its valve seat interface 22, together with mating surface 24 of valve seat 20. Mating surface 24 is longitudinally spaced apart from a pump housing interface surface 21. A curved longitudinal section edge 28 of the valve seat's mating surface 24, together with a correspondingly greater curved longitudinal section edge 26 of the valve body's valve seat interface 22, are shown schematically in detail view A to aid description herein of a rolling valve seal.

The correspondingly greater curvature of valve seat interface 22, as compared to the curvature of mating surface 24, effectively provides a rolling seal against fluid leakage which reduces wear on the surfaces in contact. The rolling seal also increases longitudinal compliance of a tunable suction or discharge valve of the invention, with the added benefit of increasing the rise and fall times of the closing energy impulse (thus narrowing the associated vibration spectrum). Widening the closing energy impulse increases rebound cycle time and correspondingly decreases rebound characteristic frequency.

Further regarding the term "correspondingly greater curvature" as used herein, note that the curvatures of the schematically illustrated longitudinal section edges (i.e., 26 and 28) and the surfaces of which they are a part (i.e., valve seat interface 22 and mating surface 24 respectively) are chosen so that the degree of longitudinal curvature of valve seat interface 22 (including edge 26) exceeds that of (i.e., has correspondingly greater curvature than) mating surface 24 (including edge 28) at any point of rolling contact. Hence, rolling contact between valve seat interface 22 and mating surface 24 is always along a substantially circular line, the plane of which is transverse to the (substantially coaxial) longitudinal axes of valve body 10 and valve seat 20.

Note that although valve seat interface 22 and mating surface 24 are schematically illustrated as curved, they may be frusto-conical in certain embodiments described herein.

Figure 8:
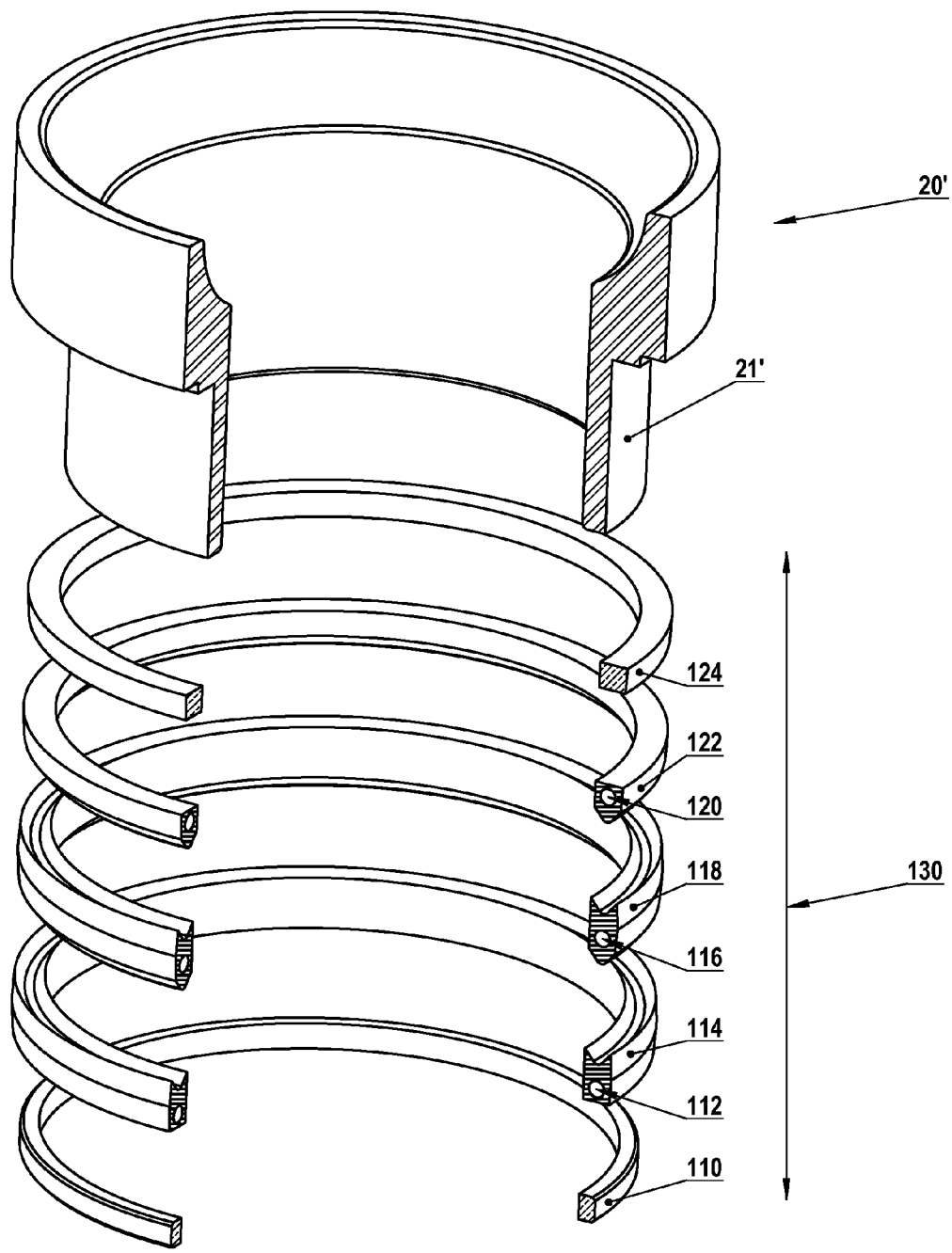
FIG. 8 is a schematic 3-dimensional exploded and partially-sectioned view of a tunable valve seat showing a mating surface longitudinally spaced apart from a lateral support mounting surface, and an adjustable lateral support assembly comprising first and second securable end spacers in combination with a plurality of circular viscoelastic support elements, each support element comprising a support circumferential tubular area.

The above discussion of rolling contact applies to the alternate valve seat 20' of FIG. 8, as it does to the valve seat 20 of FIG. 7. FIG. 8 schematically illustrates a 3-dimensional exploded and partially-sectioned view of a tunable valve seat showing a mating surface (analogous to mating surface 24 of FIG. 7) longitudinally spaced apart from a lateral support mounting surface 21'. But the lateral support mounting surface 21' in FIG. 8 differs from pump housing interface surface 21 of FIG. 7 in that it facilitates adjustably securing a lateral support assembly 130 to alternate valve seat 20'. Lateral support assembly 130 comprises first and second securable end spacers (110 and 124 respectively) in combination with a plurality of circular viscoelastic support elements (114, 118 and 122), each support element comprising a support circumferential tubular area (112, 116 and 120 respectively). Shear-thickening material in each support circumferential tubular area 112, 116 and 120 is chosen so each lateral support assembly 130 has at least one predetermined resonant frequency. Lateral support assemblies thus configured are part of each tunable valve seat and each tunable plunger seal. When part of a tunable plunger seal, one or more lateral support assemblies 130 reside in at least one recess analogous to the packing box schematically illustrated adjacent to piston/plunger 93 (i.e., as a portion of piston/plunger bore 70) in FIG. 6.

Note also that in general, a tunable (suction or discharge) valve of the invention may comprise a combination of a tunable valve assembly 99 (see, e.g., FIG. 1) and a valve seat 20 (see, e.g., FIG. 7) or a valve seat 20' (see, e.g., FIG. 8). Referring more specifically to FIG. 6, tunable suction valve 95 is distinguished from tunable discharge valve 97 by one or more factors, including each measured resonant frequency to which each tunable valve is tuned so as to optimize the overall effectiveness of valve-generated vibration attenuation in the associated pump housing 78.

What is claimed is:

1. A tunable fluid end comprising at least one subassembly, each subassembly comprising a housing, a suction valve, a discharge valve, and a plunger, at least one said valve comprising a tunable valve assembly, and at least one said valve comprising a tunable valve seat;
   wherein said tunable valve assembly comprises a valve body having guide means to maintain valve body alignment, a peripheral valve seat interface, a peripheral groove spaced apart from a central reservoir, and a plurality of viscoelastic body elements disposed in said valve body;
   wherein said tunable valve seat comprises a mating surface longitudinally spaced apart from a lateral support mounting surface, together with a lateral support assembly, said lateral support assembly being adjustably secured on said mounting surface and comprising a plurality of circular viscoelastic support elements, each said support element comprising a support circumferential tubular area;
   wherein said plurality of viscoelastic body elements comprises a reservoir element and a groove element, said viscoelastic groove element comprising a groove circumferential tubular area;
   wherein said viscoelastic reservoir element has at least a first predetermined assembly resonant frequency substantially replicating a resonant frequency of said housing; and
   wherein said groove circumferential tubular area and each said support circumferential tubular area comprises at least one shear thickening material having at least a second predetermined assembly resonant frequency similar to said first predetermined assembly resonant frequency.

2. The tunable fluid end of claim 1 wherein at least one said tunable valve seat comprises a frusto-conical mating surface, and wherein at least one said valve body peripheral valve seat interface is substantially frusto-conical.

3. The tunable fluid end of claim 1 wherein at least one said tunable valve seat comprises a curved mating surface and, wherein at least one said valve body peripheral valve seat interface has correspondingly greater curvature for achieving a rolling seal.

4. The tunable fluid end of claim 1 wherein said viscoelastic reservoir element has at least one unconstrained area.

5. The tunable fluid end of claim 4 wherein at least one said viscoelastic reservoir element unconstrained area is open to pumped-fluid pressure.

6. The tunable fluid end of claim 1 wherein said viscoelastic reservoir element is partially constrained by an adjustable preload flange coupled to said valve body.

7. The tunable fluid end of claim 1 wherein each said suction valve and each said discharge valve comprises a tunable valve assembly.

8. A tunable fluid end comprising at least one subassembly, each subassembly comprising a housing, a suction valve, a discharge valve, and a plunger, at least one said valve comprising a tunable valve assembly, and at least one said plunger having at least one tunable plunger seal;
   wherein said tunable valve assembly comprises a valve body having guide means to maintain valve body alignment, a peripheral valve seat interface, a peripheral groove spaced apart from a central reservoir, and a plurality of viscoelastic body elements disposed in said valve body;
   wherein each said tunable plunger seal comprises at least one lateral support assembly sealingly positionable along a plunger, each said lateral support assembly comprising a plurality of circular viscoelastic support elements, each said support element comprising a support circumferential tubular area;
   wherein said plurality of viscoelastic body elements comprises a reservoir element and a groove element, said viscoelastic groove element comprising a groove circumferential tubular area;
   wherein said at viscoelastic reservoir element has at least a first predetermined assembly resonant frequency substantially replicating a resonant frequency of said housing; and
   wherein said groove circumferential tubular area and each said support circumferential tubular area comprises at least one shear thickening material having at least a second predetermined assembly resonant frequency similar to said first predetermined assembly resonant frequency.

9. The tunable fluid end of claim 8 wherein each said circular viscoelastic support element comprises PEEK.

10. The tunable fluid end of claim 8 wherein an adjustable preload flange imposes an adjustable annular constraint on said viscoelastic reservoir element.

11. The tunable fluid end of claim 10 wherein said viscoelastic reservoir element adjustable annular constraint is imposed central to an annular unconstrained area.

12. The tunable fluid end of claim 11 wherein said viscoelastic reservoir element annular unconstrained area is open to pumped-fluid pressure.

13. The tunable fluid end of claim 8 wherein each said suction valve and each said discharge valve comprises a tunable valve assembly.

14. The tunable fluid end of claim 8 comprising three said subassemblies.

* * * * *